Dec. 28, 1965    R. HAUSER ETAL    3,226,548
NEUTRONIC FLUX DETECTOR
Filed Oct. 16, 1962

INVENTORS
RAYMOND HAUSER
HENRI ZYNGIER
BY
Bacon & Thomas
ATTORNEYS 3,226,548
NEUTRONIC FLUX DETECTOR
Raymond Hauser, Paris, and Henri Zyngier, Antony, France, assignors to Electricite de France (Service National)
Filed Oct. 16, 1962, Ser. No. 230,938
Claims priority, application France, Oct. 23, 1961, 876,792
4 Claims. (Cl. 250—83.1)

The present invention relates to an apparatus for the continuous detection and measurement of neutron fluxes inside a nuclear fission reactor or pile which operates continuously for very long periods.

It is known in connection with such reactors that it must be possible for the detection equipment to be left in position and function continuously throughout the entire life of the pile, that is to say, for about twenty years. Furthermore, it is known that the equipment used must permit the continuous recording or reading of the flux measured at different points of the functioning pile so as to be able to adjust at any time the "chart" of the instantaneous fluxes inside the said pile.

The known means are not adapted to the very particular conditions required for such continuous measurements, either because the effective life of certain of their elements or the period during which the sensitivity is maintained are not sufficient, or because the neutron flux measurements necessitate successive calibrations carried out by an operator, this excluding the continuous recording and/or reading of the values of this flux.

The invention has for its object to place at the disposal of the personnel responsible for the functioning of a nuclear reactor or pile, a neutron flux detector which contains an element sensitive to the neutron flux to the full extent of the range produced in the reactor, this sensitive element having a rapid response to the neutron flux variations and in addition maintaining a suitable sensitivity throughout the entire life of the installation.

According to the invention there is provided a neutron flux detector comprising a pellet releasing heat proportionally to the intensity of the flux, characterised in that the detector element is composed of two cavities in a material having a good thermal conductance, the first cavity containing the pellet and the second being subjected to the local ambient temperature inside the reactor, the two cavities being connected to one another by a conduit of small section and of a material having a low thermal conductance and a differential thermocouple measuring the difference between the temperature reached under the effect of the permanent neutron flux by the first cavity and the lower temperature reached by the second cavity.

According to one preferred embodiment of the invention, the differential thermocouple permitting the measurement of the difference between the temperatures of the first cavity and the temperature of the second cavity connected to the former is constituted by several elementary differential thermocouples mounted in series.

It is obviously essential that the material selected for the pellet of the detector have those qualities as regards sensitivity, rapidity of response and preservation of these characteristics as a function of time, which are required under the conditions of use in question. To this end, there will preferably be chosen: uranium oxide for the fluxes between 0.2 and 0.7 watt per gram of natural uranium; silver for the fluxes between 0.5 and 2.4 watts per gram of uranium; manganese for the fluxes between 2.4 and 16 watts per gram of natural uranium. For the fluxes below 0.2 watt per gram of natural uranium, it is possible to replace the natural uranium oxide by an enriched uranium oxide, the degree of enrichment being chosen in such a way that the effective life of the pellet, under 0.02 watt per gram of enriched uranium for example, is of the same order as that of natural uranium oxide under 0.2 watt per gram of natural uranium.

The invention will now be described by way of example with reference to the accompanying drawing in which.

Figure 1:
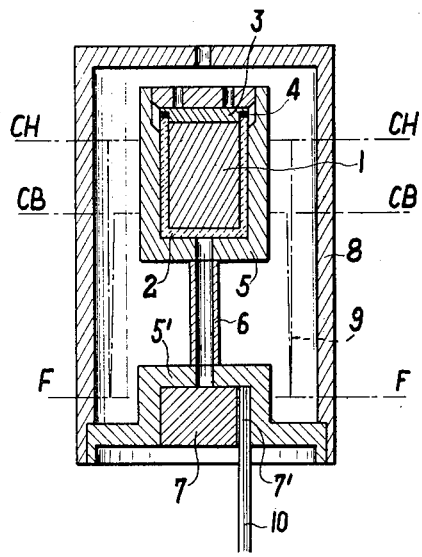
FIG. 1 is a longitudinal axial section of the flux detector.

The detector comprises a sensitive pellet 1 contained in a rigid cylindrical casing 2, the assembly of the pellet and its rigid casing being mounted in the body of the detector 5–6–5′, which is separated from the interior of the reactor by a protective shell 8 of light alloy. An assembly of differential thermocouples 9 is mounted in shell 8 with the elements, mounted in series and connected between the upper cavity 5 of the detector, heated by the sensitive pellet, and the lower colder cavity 5′. The thermocouple assembly is connected to a measuring apparatus for the neutron flux detector by a fluid-tight cable comprising two conductors 10.

The sensitive pellet 1 transforms the flux passing through the detector into heat. For fluxes in the range from 0.2 to 0.7 watt per gram of natural uranium, the pellet 1 will preferably be formed by uranium oxide $UO_2$, fritted in order to give it a sufficient consistency. For fluxes in the range between 0.5 and 2.4 watts per gram of natural uranium, the pellet will preferably be of silver, and for fluxes in the range between 2.4 and 16 watts per gram of natural uranium, it will preferably be of manganese. The materials used for forming the pellet 1 will in all cases be of a good commercial quality and of a purity known as "nuclear" purity, that is to say, suitable for it to be introduced into a functioning nuclear reactor without being accompanied by any appreciable anti-reactive effect.

The rigid casing 2 and its cover 3 will preferably be of refractory steel. In order to ensure tightness, the cover 3 is fixed on the casing 2 by means of a fluid-tight joint 4, which can with advantage be formed by a weld bead effected under vacuum. It is actually important, particularly in the case of a graphite-moderated atomic pile, to protect the graphite of the pile against chemical discharges originating from the pellet.

The body of the detector will preferably be of light alloy with an aluminum base, the permeability of which to the uranium neutron flux is very good. This body of light alloy comprises three separate parts: the upper cavity 5 which is heated by the pellet 1 through the conductive casing 2 and has its section as large as possible, so that it has a uniform temperature; the intermediate part 6, which in contrast is constricted, for example in the form of a tube of relatively small section and relatively elongated, so that the temperature gradient along this tube will be relatively large; and a lower cavity 5′, the temperature of which is in the region of the ambient temperature in the pile in proximity to this cavity.

The lower cavity 5′ in the example chosen is in the form of an inverted cup, the cylindrical base of the cup on the side of the connecting conduit or tube 6 having external and internal diameters which are identical with those of the upper cavity 5, and the lower edge of the cup closing at its bottom end the cylindrical chamber 8 which is preferably of light alloy and insulates the detector element from the reactor. The internal part of the cavity 5′ is in addition fitted with a locking plug 7 which is also of light alloy.

A groove 7′ is formed in the cylindrical plug 7, along one generatrix of its external surface, in order to permit the passage of the measuring cable 10. This cable contains two fine wires, preferably consisting of Alumel, which are insulated from one another by a refractory powder, such as for example magnesia. These two wires are respectively connected to the two ends of the assembly of differential thermocouples 9 mounted in series, the details of the construction being shown in FIGURE 2.

Each elementary differential thermocouple is formed by an Alumel-Chromel soldering or vice-versa 11, 12 . . . 18 formed on the cavity 5, that is to say, on the hottest part of the detector, this soldering being connected by a Chromel or Alumel wire to a second Chromel-Alumel soldering or vice versa 11', 12' . . . 18', which is formed on the cold cavity 5'.

Figure 2:
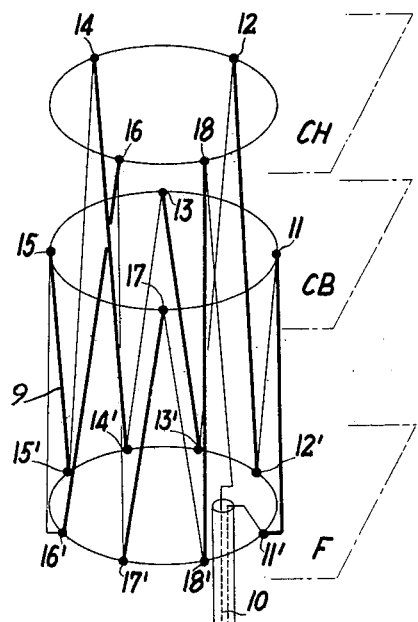
FIGS. 2 and 3 are respectively a schematic perspective view and horizontal projection of one embodiment of a differential thermocouple for measuring the temperature differences given by the detector.
Figure 3:
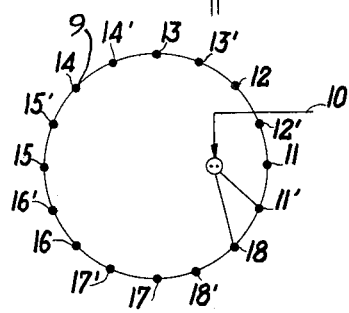

It will be seen from FIG. 2 that, in the example chosen, the solderings 11 to 18 are distributed in two horizontal planes: 11, 13, 15, 17 on the lower plane C.B. (lower hot end) and 12, 14, 16, 18 on the upper plane C.H. (upper hot end), while all the spots of solders 11' to 18' are in the same plane F (cold). These arrangements have been adopted so as to obtain a more regular law of proportionality of the temperatures as a function of the flux variations which it is desired to measure.

When the detector which has just been described is permanently positioned inside a functioning nuclear reactor, the wires of the cable 10 being connected to a measuring apparatus of the galvanometer type, for example, the device operates in the following manner: the pellet 1 is immersed in the neutron flux to be measured, the different walls 2–5–8 which separate it from the interior of the reactor being of good permeability with respect to this flux either because of their nature 5–8 or because of their small thickness 2.

The heat liberated, which is proportional to the neutron flux, is then discharged through the metal elements 5–6–5', which thus serve the purpose of a thermal shunt. In balanced running, the cavity 5 constitutes a hot source and the cavity 5' a cold source, between which a constant heat flux flows through the conduit 6, this heat flux depending only on the neutron flux to be measured and the thermal conductivity of the detector element.

The quantity to be measured being the difference in temperature between the two cavities 5 and 5', this measurement is effected by means of a differential thermocouple giving a true indication, even of small temperature gradients (difference of extreme temperatures related to the mean temperature). The use of Alumel-Chromel differential thermocouples connected in series additionally enables the sensitivity to be increased. In effect, the signal received between the two wires of the cable 10 is the sum of the signals of which each individually would be obtained by means of a single elementary differential thermocouple. In addition, this arrangement of several thermocouples in series makes it possible to take into account a mean temperature at the surface of the part 5 of the body or element containing the pellet 1 and not of the more uncertain temperature which would be found at a single point of 5.

Finally, the material forming the pellet 1 has been chosen, from all the possible elements, in such a way as to have a fairly large sensitivity and a sufficient rapidity of response to the variations in neutron flux, which are maintained throughout the entire life of the nuclear reactor, that is to say, in practice for about twenty years. In fact, the sensitivity decreases with time and more exactly with the integrated flux, but in a manner which it is possible to calibrate beforehand, so that it will be possible to compensate for the de-sensitisation of the inaccessible detectors during the operation of the reactor by increasing in inverse ratio the adjustable amplifications of the external measuring apparatus which is adapted to it.

What we claim:

1. A neutron flux detector comprising: means defining first and second spaced cavities, said means being of a material having good thermal conductivity; said first cavity containing a pellet of material which gives off heat when exposed to neutron radiation, in proportion to the neutron flux density; said second cavity being in heat absorbing relation to the local ambient temperature; a thin-wall small diameter cylindrical tube extending between said cavities, said tube being of a material having low thermal conductivity; and a differential thermocouple arranged to detect the difference in temperature between said cavities.

2. A neutron flux detector as defined in claim 1 wherein said pellet comprises material selected from the group consisting of uranium oxide, silver and manganese; said material being uranium oxide for flux densities between .2 and .7 watt/gm. of natural uranium, being of silver for flux densities between .5 and 2.4 watts/gm. of natural uranium, and being of manganese for flux densities between 2.4 and 16 watts/gm. of natural uranium.

3. A neutron flux detector as defined in claim 1 characterised in that the pellet is disposed inside a thin fluid-tight casing of refractory steel within said first cavity.

4. A neutron flux detector as defined in claim 1 characterised in that said cavities, tube and thermocouple are disposed in a closed chamber formed of light alloy.

References Cited by the Examiner

UNITED STATES PATENTS

| | | | |
|---|---|---|---|
| 2,824,971 | 2/1958 | Weeks | 250—83.1 |
| 2,997,587 | 8/1961 | Mims | 250—83.1 |
| 3,001,072 | 9/1961 | Glick | 250—83.1 |
| 3,028,494 | 4/1962 | Wickersham et al. | 250—83.1 |

RALPH G. NILSON, *Primary Examiner.*

ARCHIE R. BORCHELT, *Examiner.*